(12) United States Patent
Tamaru et al.

(10) Patent No.: US 6,894,967 B2
(45) Date of Patent: May 17, 2005

(54) OPTICAL DISK RECORDER FOR WRITING DATA WITH VARIABLE DENSITY

(75) Inventors: Takuya Tamaru, Hamamatsu (JP); Tatsuo Fushiki, Hamamatsu (JP); Katsuichi Osakabe, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 409 days.

(21) Appl. No.: 09/990,399

(22) Filed: Nov. 20, 2001

(65) Prior Publication Data

US 2002/0105867 A1 Aug. 8, 2002

(30) Foreign Application Priority Data

| Nov. 21, 2000 | (JP) | ............................. 2000-353946 |
| Feb. 26, 2001 | (JP) | ............................. 2001-050732 |
| Mar. 7, 2001 | (JP) | ............................. 2001-062885 |

(51) Int. Cl.$^7$ ............................................. G11B 7/007
(52) U.S. Cl. ................. 369/59.25; 369/47.27; 369/47.34
(58) Field of Search ................... 369/59.25, 59.26, 369/47.31, 47.21, 47.27, 59.23

(56) References Cited

U.S. PATENT DOCUMENTS

| 5,592,452 | A | 1/1997 | Yoshimoto et al. |
| 6,339,571 | B1 * | 1/2002 | Torazawa et al. .......... 369/53.2 |
| 6,424,615 | B1 * | 7/2002 | Ishimura et al. ......... 369/275.3 |
| 6,577,574 | B1 * | 6/2003 | Heemskerk et al. ..... 369/59.23 |
| 6,711,107 | B2 * | 3/2004 | Chao et al. .............. 369/47.52 |

FOREIGN PATENT DOCUMENTS

| EP | 1089271 A2 | 9/2000 |
| EP | 1089282 A2 | 4/2001 |
| JP | 10-241298 | 9/1998 |
| WO | WO 00/57420 | 9/2000 |
| WO | WO 00/63897 | 10/2000 |

* cited by examiner

Primary Examiner—W. R. Young
Assistant Examiner—Michael V. Battaglia
(74) Attorney, Agent, or Firm—Pillsbury Winthrop LLP

(57) ABSTRACT

An optical disk recording apparatus operates on an optical disk having circular tracks which are provisionally written with an index signal used for securing a constant linear velocity of the optical disk from an innermost circular track to an outermost circular track, and records data along the circular tracks at different linear densities on different annular zones of the optical disk. In the apparatus, a disk drive section rotates the optical disk while synchronizing the index signal successively read from the rotated optical disk with a predetermined reference clock signal to thereby maintain the constant linear velocity of the circular tracks. A clock generating section multiplies or divides the reference clock signal by different rates to generate different writing clock signals in correspondence to the different annular zones of the optical disk. A data recording section operates in synchronization to the different writing clock signals for recording data along the circular tracks at the different linear densities on the different annular zones.

7 Claims, 12 Drawing Sheets

OPTICAL DISK RECORDER FOR WRITING DATA WITH VARIABLE DENSITY

BACKGROUND OF THE INVENTION

The present invention relates to an optical disk recording method and an optical disk recording apparatus for enabling recording of data with recording densities differing from a standard specification of an optical disk to be used.

The present invention also relates to an optical disk recording method and apparatus for recording information on optical disks such as CD-R, CD-RW, CD-WO, MD, DVD, etc. More specifically, the present invention concerns an optical disk recording method and apparatus for dividing a recording area into a plurality of recording zones and for recording data in respective recording zones with different linear densities.

A groove called a pre-groove is formed previously during a course of manufacturing recordable optical disks compliant with CD (compact disk) standards such as a CD-R (CD recordable), a CD-RW (CD rewritable), etc. The pre-groove wobbles. The wobbling frequency is FM-modulated according to absolute position information called ATIP (Absolute Time In Pre-groove). In this specification, a "position" may include the meaning of time. During recording, a wobbling signal is extracted from a photodetecting return signal of an optical pickup. The wobbling signal is FM-demodulated to reproduce the ATIP information. The ATIP information is used to detect an absolute position on the disk. Record information (given information to be recorded) is provided with the detected absolute position information corresponding to the ATIP information as a subcode for recording. Each position in a program area records subcode absolute time information having the same content as that of the ATIP information at the corresponding position. During data reproduction, the absolute position information is decoded from the subcode information included in the reproduced information to detect the absolute position on the disk.

A pre-groove is also previously formed during the disk manufacturing process for recordable optical disks compliant with DVD (digital versatile disk) specifications, such as a DVD-R (DVD recordable), a DVD-RW (DVD rewritable), etc. The pre-groove wobbles at a specified wobbling frequency. During the disk manufacturing process, a pre-pit is previously formed on a land between adjacent pre-grooves. Each pre-pit includes absolute position information called ATIP. During recording, a pre-pit signal is extracted from a photodetecting return signal of an optical pickup. The ATIP information is decoded from the pre-pit signal. The ATIP information is used to detect an absolute position on the disk. Record information is provided with absolute position information as a subcode corresponding to the detected absolute position information for recording. Each position in a program area records subcode absolute time information having the same content as that of the ATIP information at the corresponding position. During data reproduction, the absolute position information is decoded from the subcode information included in the reproduced information to detect the absolute position on the disk.

The conventional recording method predetermines the data recording density according to optical disk specifications. The data recording density cannot be changed. Accordingly, there is no way but changing a track pitch or a reference linear speed of the optical disk itself for ensuring high-density recording or low-density high-quality recording. An existing optical disk is incapable of using a data recording density differing from the specification for recording.

Generally, a system for recording data on CD-R and CD-RW disks employs a constant linear density for increasing the data recording capacity. For this purpose, a wobble is used as a control signal for ensuring the constant linear density and is previously overlapped with a track spirally formed from the innermost periphery to the outermost periphery on an optical disk. FIG. 7 is a schematic block diagram showing a configuration of a conventional optical disk recording apparatus under control of the constant linear velocity for performing constant linear density recording. A spindle motor (SPM) 102 rotatively drives an optical disk 101. A wobble signal is read from the optical disk 101 via a pickup 103 and is supplied to a PLL/wobble decoder 104. The PLL/wobble decoder 104 is also supplied with a reference clock (reference CLK) generated in a reference clock generator 106 based on an oscillation output from a quartz oscillator 105. The PLL/wobble decoder 104 controls revolution of a spindle motor 102 via a spindle controller 107 so that the wobble signal or index signal synchronizes with the reference clock. Accordingly, the optical disk 101 is controlled for rotation with the constant linear velocity.

A divider/multiplier 108 divides or multiplies the reference clock with a fixed ratio of D, and generates an EFM clock (EFM-CLK) having a frequency which is D times higher than the reference clock. An EFM/CD encoder 109 encodes data to be recorded into a specified recording format according to the EFM clock. A write strategy circuit 110 generates record data from the encoded data according to the EFM clock. This record data is written on the optical disk 101 with the constant linear density by means of laser irradiation from the pickup 103.

In recent years, recording media such as CD-R, CD-RW, etc. are available at low prices and are becoming the mainstream of recording media along with the widespread use and the improved manufacturing technology of these media. As exemplified by DVD, there is remarkable advancement in developing a laser used for the pickup and other fundamental technologies for data recording and reproduction. By applying an improved fundamental recording technology to inexpensively available media, there is an increasing demand for additional values such as a higher recording density and improved security while maintaining compatibility with the existing standards.

SUMMARY OF THE INVENTION

The present invention has been made in consideration of the foregoing. It is therefore a first object of the present invention to provide an optical disk recording method and an optical disk recording apparatus capable of using a data recording density differing from the specification of an optical disk to be used.

The present invention has been made in consideration of the foregoing. It is therefore a second object of the present invention to provide an optical disk recording system and reproduction system capable of performing a plurality of independent recording operations by using different linear densities on an optical disk originally designed for recording data with a constant linear density.

The present invention has been made in consideration of the foregoing. It is therefore a third object of the present invention to provide an optical disk recording method, an optical disk recording apparatus, and an optical disk recorded with data by that recording method capable of successively performing a plurality of independent recording operations with different linear densities on an optical disk which is even designed for recording data with a constant linear density.

In a first aspect of the invention, an optical disk recording method records contents information on a track of a recordable optical disk which is previously recorded with first index information in the form of sequentially progressive position information or time information along the track in a specified format. The optical disk recording method additionally provides the contents information with second index information in the form of position information or time information which sequentially progresses at a progressing rate differing from that of the position information or time information previously recorded on the optical disk. According to this optical disk recording method, the contents information is additionally provided with position information or time information which sequentially progresses at a progressing rate differing from that of the position information or time information previously recorded on the optical disk. Because of this, it is possible to record information with a recording density differing from specifications of an optical disk to be used, and to provide high-density recording and low-density high-quality recording.

The second index information in the form of the position information or time information attached to the contents information can be designed to progress at a specified velocity scaling factor with respect to a progressing rate of the first index information in the form of the position information or time information previously recorded on the optical disk. In this case, when the specified velocity scaling factor is greater than 1, high-density recording is implemented. Especially, when the specified velocity scaling factor is an integer, it is possible to sequentially advance and record the position information or time information at each unit segment obtained by equally dividing the unit segment of the position information or time information previously recorded on an optical disk by that integer. This makes the record control easy. By contrast, when the specified velocity scaling factor is less than 1, low-density high-quality recording is implemented. Especially, when the specified velocity scaling factor is the reciprocal of an integer, it is possible to sequentially advance and record the position information or time information at each unit segment obtained by multiplying the unit segment of the position information or time information previously recorded on an optical disk by that integer. This makes the record control easy.

An optical disk apparatus according to the present invention records any contents information provided with sequentially progressing position information or time information on a track of a recordable optical disk, wherein sequentially progressing position information or time information is previously recorded in a specified format along the track. The optical disk apparatus is comprised of a data transmission circuit for transmitting the contents information at a transfer rate, wherein the position information or time information attached to the contents information is recorded at a progressing rate differing from that of the position information or time information previously recorded in the optical disk, and a laser driver for recording data on the optical disk by modulating a laser beam according to the transmitted contents information.

An optical disk apparatus according to the present invention records any contents information provided with sequentially progressing position information or time information on a track of a recordable optical disk, wherein sequentially progressive position information or time information is previously recorded in a specified format along the track. The optical disk apparatus is comprised of a position information/time information demodulation circuit for demodulating the position information or time information previously recorded on the optical disk from a photodetecting return signal of an optical pickup, a data transmission circuit for transmitting the contents information at a transfer rate, wherein the position information or time information attached to the contents information progresses at a specified velocity scaling factor relative to a progressing rate of the demodulated position information or time information, and a laser driver for recording data on the optical disk by modulating a laser beam according to the transmitted contents information.

An optical disk apparatus according to the present invention records any contents information provided with sequentially progressing position information or time information on a track of a recordable optical disk, wherein sequentially progressing position information or time information is previously recorded in a specified format along the wobbling track. The optical disk apparatus is comprised of a spindle servo circuit for detecting a disk wobble signal or a signal corresponding to the disk wobble signal from a photodetecting return signal of an optical pickup and for controlling a rotation of a spindle motor so that the signal becomes a specified frequency, a position information/time information demodulation circuit for demodulating the position information or time information previously recorded on the optical disk from a photodetecting return signal of the optical pickup, a data transmission circuit for transmitting the contents information at a specified transfer rate, wherein the position information or time information attached to the contents information progresses at a specified velocity scaling factor relative to a progressing rate of the demodulated position information or time information, and a laser driver for recording data on the optical disk by modulating a laser beam according to the transmitted contents information.

As the position information or time information previously recorded on an optical disk, for example, the ATIP information is recorded in a disk wobble according to frequency modulation in the case of CD standard optical disks such as CD-R and CD-RW disks. The ATIP information is recorded as a pre-pit on the land or in the groove in the case of DVD standard optical disks such as DVD-R disks and DVD-RW disks. Information called ADIP (ADdress In Pre-groove) is recorded in a disk wobble according to frequency modulation in the case of MD (mini-disk) standard optical disks (magnetic optical disks). These types of ATIP information and ADIP information are recorded in a format not erased by subsequent recording of contents information during a process of manufacturing optical disks.

In a second aspect of the invention, an optical disk recording system uses an optical disk continuously recording an index signal or linear density control signal from the innermost periphery to the outermost periphery with a constant linear density in order to ensure a recording linear density of data, divides a recording area of the optical disk into a plurality of recording zones, and records data in the plurality of recording zones using different linear densities. The system is comprised of rotation driving means for rotatively driving the optical disk with a constant linear velocity such that the linear density control signal read from the optical disk synchronizes with a specified reference clock, writing clock generation means for generating a writing clock by multiplying or dividing the reference clock or a clock based on the linear density control signal read from the optical disk at different ratios for respective recording zones on the optical disk, recording means for recording the data on the optical disk according to the writing clocks generated by the writing clock generation means.

The present invention changes the ratio of division/multiplication for the reference clock, depending on each recording zone while controlling the optical disk with the constant linear velocity based on the linear density control signal. It is possible to apply a plurality of independent recording operations to an optical disk at different data recording linear densities.

For example, the present invention makes it possible to record data with a specified linear density as defined in the CD standards along an inner periphery zone of the optical disk, and to record data with a higher linear density than for the inner periphery zone along an outer periphery zone of the optical disk. In this case, data of the inner periphery side can be reproduced without errors when a conventional optical disk reproduction apparatus is used for reproduction. A specific reproduction apparatus capable of reproducing high-density recording disks can reproduce all information from both of the inner and outer annular zones and therefore can increase a recording capacity compared to the prior art. Further, it is possible to create a disk with high security by recording data with desired linear densities individually specified for a plurality of recording zones.

An optical disk reproduction system according to the present invention reproduces data from an optical disk which is divided into a plurality of recording zones and which records data in the plurality of recording zones using different linear densities. The system is comprised of rotation driving means for rotatively driving the optical disk with a constant revolution speed, operation means for repeatedly acquiring information about a reproduction point on the optical disk and information about a recording linear density of data corresponding to the reproduction point at a specified time interval and for repeatedly computing a reproduction clock speed for data at the specified time interval based on these acquired information and the revolution speed of the optical disk, and reproduction means for reproducing data recorded on the optical disk by using the reproduction clock speed computed by the operation means as a lock range.

In a third aspect of the invention, an optical disk recording method uses an optical disk, which continuously records an index signal or linear density control signal from the innermost periphery to the outermost periphery with a constant linear density in order to specify a recording linear density of data, which divides a recording area of the optical disk into a plurality of recording zones, and which records data in the plurality of recording zones using different linear densities, wherein data is recorded by gradually changing the recording linear densities between adjacent recording zones on the optical disk.

The inventive method is designed to record data such that the recording linear density gradually changes between adjacent recording zones on the optical disk. Accordingly, it is possible to successively record data on a plurality of recording zones with different recording linear densities without temporarily stopping the operation. This eliminates a seek operation or a setting operation, while shortening the recording time and decreasing the number of recording steps.

According to a preferred embodiment of the present invention, a recording area on the optical disk is divided into a first zone along the inner periphery and a second zone along the outer periphery. The first zone records data with a first recording linear density as a standard density. The second zone records data with a second recording linear density as a higher density than the standard density. In this case, the first and second zones are each provided with a lead-in area, a program area, and a lead-out area in the order from the top of each zone, and record the data such that the recording linear density gradually changes from the first recording linear density to the second recording linear density between the top of the lead-out area in the first zone and the end of the lead-in area in the second zone. Especially, the data is preferably recorded such that the recording linear density gradually changes from the first recording linear density to the second recording linear density between the top and the end of the lead-out area in the first zone. If a reverse seek moves a reproduction position from the second zone to the first zone during the data reproduction, the aforementioned recording enables smooth signal reproduction, thereby allowing a return to a correct position.

An optical disk according to the present invention records data based on the aforementioned recording method. Further, an optical disk recording apparatus according to the present invention uses an optical disk which is continuously recorded with a linear density control signal from the innermost periphery to the outermost periphery with a constant linear density in order to specify a recording linear density of data, divides a recording area of the optical disk into a plurality of recording zones, and records data in the plurality of recording zones using different linear densities. The apparatus is comprised of rotation driving means for rotatively driving the optical disk, a pickup for reading the linear density control signal from the optical disk and for recording data on the optical disk, writing clock generation means for recording data based on the linear density control signal acquired via the pickup, recording control means for recording data on the optical disk via the pickup according to a writing clock generated by the writing clock generation means, and linear density control means for controlling a bit rate of the writing clock relative to a revolution speed of the optical disk such that the recording linear density of the data gradually changes between adjacent recording zones on the optical disk.

As the linear density control means, it may be preferable to control the rotation driving means and to change the revolution speed of the optical disk so that the recording linear density of the data gradually changes between adjacent recording zones on the optical disk. Alternatively, it may be also preferable to control the writing clock generation means and to change a bit rate of the writing clock such that the recording linear density of the data gradually changes between adjacent recording zones on the optical disk.

DETAILED DESCRIPTION OF THE INVENTION

Figure 1:
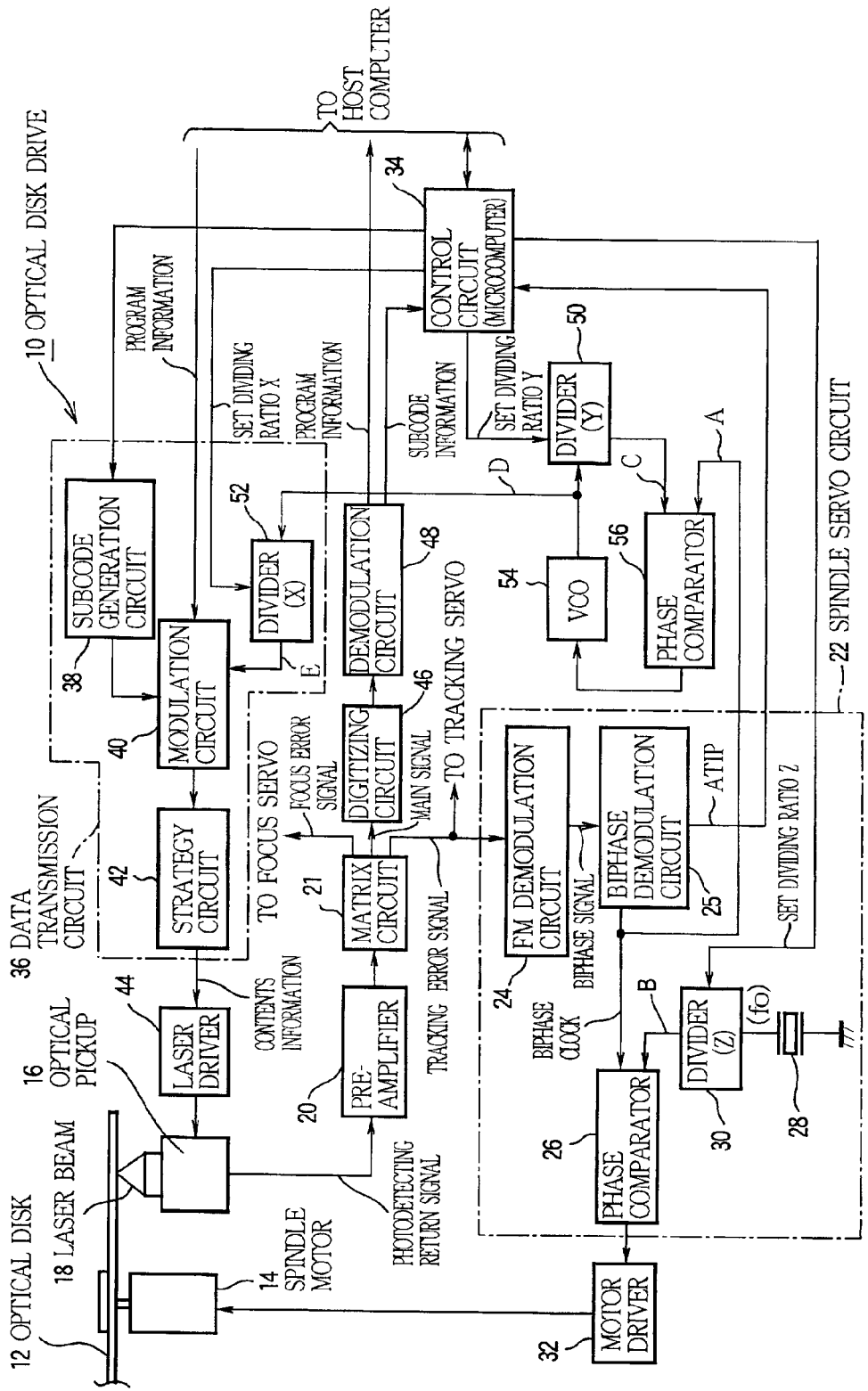
FIG. 1 is a system configuration block diagram showing a first embodiment of the optical disk recording apparatus according to the present invention.

First embodiment of the present invention is described below. The following describes a case where the present invention is applied to an optical disk drive (CD-R/RW drive) for recording and reproducing of data on CD-R and CD-RW disks. FIG. 1 outlines a system configuration of the optical drive. A optical disk drive 10 is connected to a host computer (not shown). An optical disk 12 is a CD-R or CD-RW disk. A wobbling pre-groove is formed on a recording surface of the optical disk 12. The wobbling is frequency-modulated according to ATIP information.

A spindle motor 14 rotates the optical disk 12. A laser beam 18 is irradiated from an optical pickup 16 for recording and reproducing information. A photodetecting return signal from each photodetecting element is output from the optical pickup 16 during the recording, and is input to a matrix circuit 21 via a preamplifier 20. The matrix circuit 21 processes the photodetecting return signals from respective photodetecting elements with each other, and outputs a tracking error signal, a focus error signal, and a main signal (signal totaling all main beam photodetecting signals). Of these signals, the tracking error signal is used for tracking servo and is supplied to a spindle servo circuit 22. In the spindle servo circuit 22, an FM demodulation circuit 24 FM-demodulates an output signal from the preamplifier 20 to extract a biphase signal and supplies it to a biphase demodulation circuit 25.

The biphase demodulation circuit 25 biphase-demodulates the biphase signal to extract an ATIP signal and a biphase clock (a signal corresponding to the disk wobble signal). The biphase clock is input to one input terminal of a phase comparator 26. A clock signal having a specified frequency fo is output from a quartz oscillator 28, is then divided in a divider 30 at a specified division ratio, and is input to the other input terminal of the phase comparator 26. The phase comparator 26 outputs an error signal corresponding to a phase difference between both the inputs. A motor driver 32 drives the spindle motor 14 in response to this error signal. Based on the above-mentioned control loop, a rotational speed of the spindle motor 14 is PLL-controlled so that the biphase clock is phase-locked to the output signal from the divider 30. When the optical disk 12 is rotated at a standard linear velocity (single velocity) and is recorded with information at a standard recording density (single density), the wobble signal is set to a frequency of 22.05 kHz as specified. At this time, the biphase clock is set to a frequency of 6.3 kHz as specified. In this case, the divider 30 is set to a division ratio of 6.3 k/fo so as to output a 6.3 kHz signal. Consequently, a spindle servo is applied so that the wobble signal frequency becomes 22.05 kHz and the biphase clock frequency becomes 6.3 kHz. The ATIP information demodulated in the biphase demodulation circuit 25 is supplied to a control circuit 34 (microcomputer). Consequently, the control circuit 34 can realtime identify the absolute position traced by the laser beam 18 during the recording.

During the recording, the control circuit 34 generates absolute time information or first index information corresponding to the detected ATIP information, relative time information progressing at the same rate as the absolute time information, and other information needed for subcode generation. In a data transmission circuit 36, a subcode generation circuit 38 generates a subcode based on the information generated in the control circuit 34. A modulation circuit 40 attaches the subcode information or second index information to program information or contents information supplied from the host computer at a transfer rate corresponding to the recording linear velocity scaling factor and the recording density scaling factor prescribed from the host computer. A modulation circuit 40 EFM-modulates this information and sequentially outputs CD-format bit streams at a transfer rate corresponding to the prescribed recording linear velocity scaling factor and recording density scaling factor. This signal is adjusted for the timing axis in a strategy circuit 42 and is input to a laser driver 44. Corresponding to this signal (record information), the laser driver drives a laser light source (laser diode) in the optical pickup and modulates the laser beam 18 using the record information. Thus, the information is recorded on the optical disk 12.

The main signal output from the matrix circuit 21 during data reproduction is digitized in a digitizing circuit 46, and is EFM-demodulated and subcode-demodulated in a demodulation circuit 48 for reproducing the program information and the subcode information. The program information is transmitted to the host computer. The subcode information is supplied to the control circuit 34. Based on the absolute position information included in the subcode information, the control circuit 34 realtime keeps track of the absolute position traced by the laser beam 18 during the reproduction. The reproduction operation does not use the ATIP information demodulated in the biphase demodulation circuit 25. Spindle control during the reproduction follows the PLL control (not shown) based on a reproduction clock generated from the reproduced EFM signal instead of the PLL control based on the biphase clock during the recording.

During the recording, the control circuit 34 variably sets division ratios Z, Y, and X for the respective frequency dividers 30, 50, and 52 according to the prescribed recording linear velocity scaling factor and recording density scaling factor. A VCO (voltage-controlled oscillator) 54 outputs a clock signal. This signal is divided in the divider 50 and is input to one input terminal of a phase comparator 56. A biphase clock is input to the other input terminal of the phase comparator 56. The phase comparator 56 outputs a phase error signal between both the inputs. This phase error signal drives the VCO 54. The oscillation frequency of the VCO 54 is controlled so that a phase of an output signal from the divider 50 matches with the biphase clock. An oscillation clock for the VCO 54 is divided in the divider 52 and is supplied to the modulation circuit 40 for use as a reference clock for modulation. If the recording density scaling factor is changed for recording, this change affects only the data recording density per unit track length, not the content of the record information.

The following describes examples of setting frequencies for portions A to E in FIG. 1, setting division ratios X, Y, and Z for the dividers 52, 50, and 30, and setting other parameters when contents information is recorded in the program area of the optical disk 12.

(1) Single Density Recording

Table 1 lists setting examples for performing single density (default recording density) recording at various recording speeds of a single-speed (default linear velocity), a double-speed, and a quad-speed.

TABLE 1

|  | Single-speed recording | Double-speed recording | Quad-speed recording |
| --- | --- | --- | --- |
| A (Hz) | 6.3 k | 12.6 k | 25.2 k |
| B (Hz) | 6.3 k | 12.6 k | 25.2 k |
| C (Hz) | 6.3 k | 12.6 k | 25.2 k |
| D (Hz) | 345 M | 345 M | 345 M |
| E (Hz) | 8.6 M | 17.2 M | 34.5 M |
| X (= E/D) | 1/40 | 1/20 | 1/10 |
| Y (= C/D) | 6.3 k/345 M | 12.6 k/345 M | 25.2 k/345 M |
| Z (= B/fo) | 6.3 k/fo | 12.6 k/fo | 25.2 k/fo |
| Spindle control reference | Biphase clock | Biphase clock | Biphase clock |
| Recording linear velocity (m/second) | 1.2 | 2.4 | 4.8 |
| Record information transfer rate (MHz) (1/channel bit cycle) | 4.3218 | 8.6436 | 17.2872 |

The control circuit 34 generates subcode absolute time information and subcode relative time information which progresses at the same ratio as the detected ATIP information. Each track position or point in the program area on the optical disk 12 stores subcode absolute position information in FIG. 2(b) having the same content as the ATIP information in FIG. 2(a).

(2) Single-speed Variable Density Recording (Default Linear Velocity and Variable Data Transfer Rate)

Table 2 lists setting examples for recording information on an optical disk having the same specification as shown in Table 1 by using the default linear velocity, variable transfer rates for record information, and variable recording densities with the factors of 1.5, 2, 4, and ½.

TABLE 2

|  | 1.5-density recording | Double-density recording | Quad-density recording | Half-density recording |
| --- | --- | --- | --- | --- |
| A (Hz) | 6.3 k | 6.3 k | 6.3 k | 6.3 k |
| B (Hz) | 6.3 k | 6.3 k | 6.3 k | 6.3 k |
| C (Hz) | 6.3 k | 6.3 k | 6.3 k | 6.3 k |
| D (Hz) | 345 M | 345 M | 345 M | 345 M |
| E (Hz) | 12.9 M | 17.2 M | 34.5 M | 4.3 M |
| X (= E/D) | 1/27 | 1/20 | 1/10 | 1/80 |
| Y (= C/D) | 6.3 k/ 345 M | 6.3 k/ 345 M | 6.3 k/ 345 M | 6.3 k/ 345 M |
| Z (= B/fo) | 6.3 k/fo | 6.3 k/fo | 6.3 k/fo | 6.3 k/fo |
| Spindle control reference | Biphase clock | Biphase clock | Biphase clock | Biphase clock |
| Recording linear velocity (m/second) | 1.2 | 1.2 | 1.2 | 1.2 |
| Record information Transfer rate (MHz) (1/channel bit cycle) | 6.4827 | 8.6436 | 17.2872 | 2.1609 |

Figure 2:
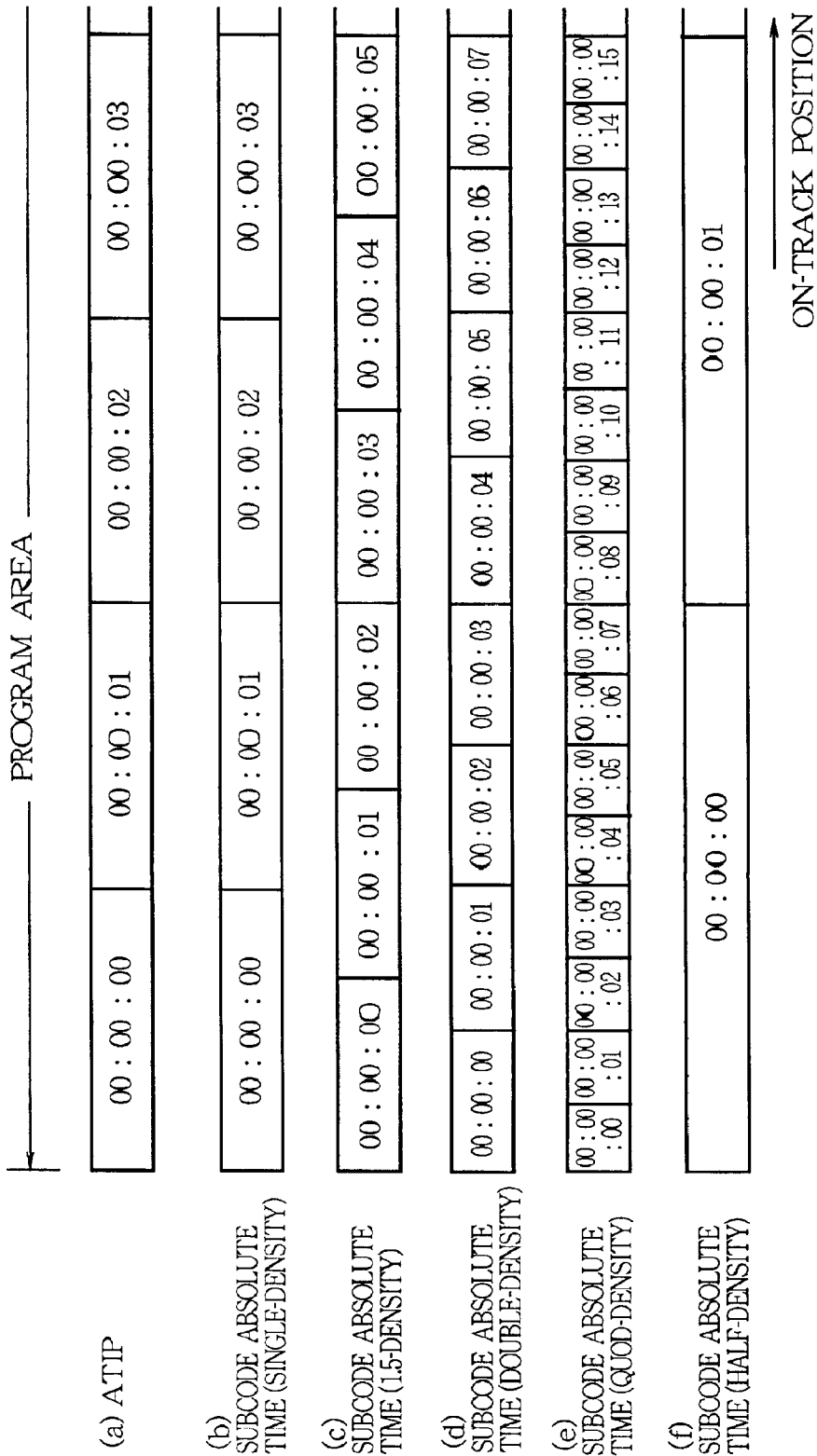
FIG. 2 shows an example of relation between ATIP time information and subcode absolute time information on an optical disk recorded in the optical disk recording apparatus shown in FIG. 1.

Based on to the detected ATIP information having a first progression rate, the control circuit 34 generates subcode absolute time information and subcode relative time information which progress at a second progression rate or a velocity scaling factor corresponding to the recording density scaling factor. Corresponding to the ATIP information in FIG. 2(a), each track position in the program area on the optical disk 12 records the absolute time information progressing at a 1.5-speed as shown in FIG. 2(c) during the 1.5-density recording, progressing at a double-speed as shown in FIG. 2(d) during the double-density recording, progressing at a quad-speed as shown in FIG. 2(e) during the quad-density recording, and progressing at a half-speed as shown in FIG. 2(f) during the half-density recording.

(3) Single-speed Variable Density Recording (Variable Linear Velocity and Default Data Transfer Rate)

Table 3 lists setting examples for recording information on an optical disk having the same specification as shown in Table 1 by using the default transfer rate for record information, a variable linear velocity (single-speed), and recording densities with the factors of 1.5, 2, 4, and ½.

TABLE 3

|  | 1.5-density recording | Double-density recording | Quad-density recording | Half-density recording |
| --- | --- | --- | --- | --- |
| A (Hz) | 4.2 k | 3.15 k | 1.58 k | 12.6 k |
| B (Hz) | 4.2 k | 3.15 k | 1.58 k | 12.6 k |
| C (Hz) | 4.2 k | 3.15 k | 1.58 k | 12.6 k |
| D (Hz) | 345 M | 345 M | 345 M | 345 M |
| E (Hz) | 8.6 M | 8.6 M | 8.6 M | 8.6 M |
| X (= E/D) | 1/40 | 1/40 | 1/40 | 1/40 |
| Y (= C/D) | 4.2 k/ 345 M | 3.15 k/ 345 M | 1.58 k/ 345 M | 12.6 k/ 345 M |
| Z (= B/fo) | 4.2 k/fo | 3.15 k/fo | 1.58 k/fo | 12.6 k/fo |
| Spindle control reference | Biphase clock | Biphase clock | Biphase clock | Biphase clock |
| Recording linear velocity (m/second) | 0.8 | 0.6 | 0.3 | 2.4 |
| Record information Transfer rate (MHz) (1/channel bit cycle) | 4.3218 | 4.3218 | 4.3218 | 4.3218 |

With respect to the detected ATIP information, the control circuit 34 generates subcode absolute time information and subcode relative time information which progress at a velocity scaling factor corresponding to the recording density scaling factor. Corresponding to the ATIP information in FIG. 2(a), each track position in the program area on the optical disk 12 records absolute time information progressing at a 1.5-speed as shown in FIG. 2(c) during the 1.5-density recording, progressing at a double-speed as shown in FIG. 2(d) during the double-density recording, progressing at a quad-speed as shown in FIG. 2(e) during the quad-density recording, and progressing at a half-speed as shown in FIG. 2(f) during the half-density recording.

Table 4 lists parameters when reproducing the optical disk recorded with the above-mentioned recording density scaling factors at the default linear velocity.

TABLE 4

|  | 1.5-density recording | Single-density recording | Double-density recording | Quad-density recording | Half-density recording |
|---|---|---|---|---|---|
| Spindle control reference | Reproduction clock | Reproduction clock | Reproduction clock | Reproduction clock | Reproduction clock |
| Reproduced linear velocity (m/second) | 0.8 | 1.2 | 0.6 | 0.3 | 2.4 |
| Reproduction information transfer rate (MHz) | 4.3218 | 4.3218 | 4.3218 | 4.3218 | 4.3218 |
| Maximum capacity (megabytes) | 975 | 650 | 1300 | 2600 | 325 |
| Maximum reproduction Time (minutes) | 111 | 74 | 148 | 296 | 37 |

The above-mentioned examples (2) and (3) have explained the single-speed variable density recording. It is possible to provide setting for double-speed variable density recording, quad-speed variable density recording, and so on by changing recording linear velocity scaling factors. The above-mentioned embodiment has described application of the present invention to recording of information on a CD-standard optical disk. The present invention can be applied to recording on DVD-standard optical disks such as DVD-RW, MD-standard optical disks (magneto-optical disks), and other optical disks according to various standards. The above-mentioned embodiment has described application of the present invention to the optical disk connected to a host computer. The present invention is also applicable to a standalone optical disk recording apparatus such as a CD recorder.

Figure 3:
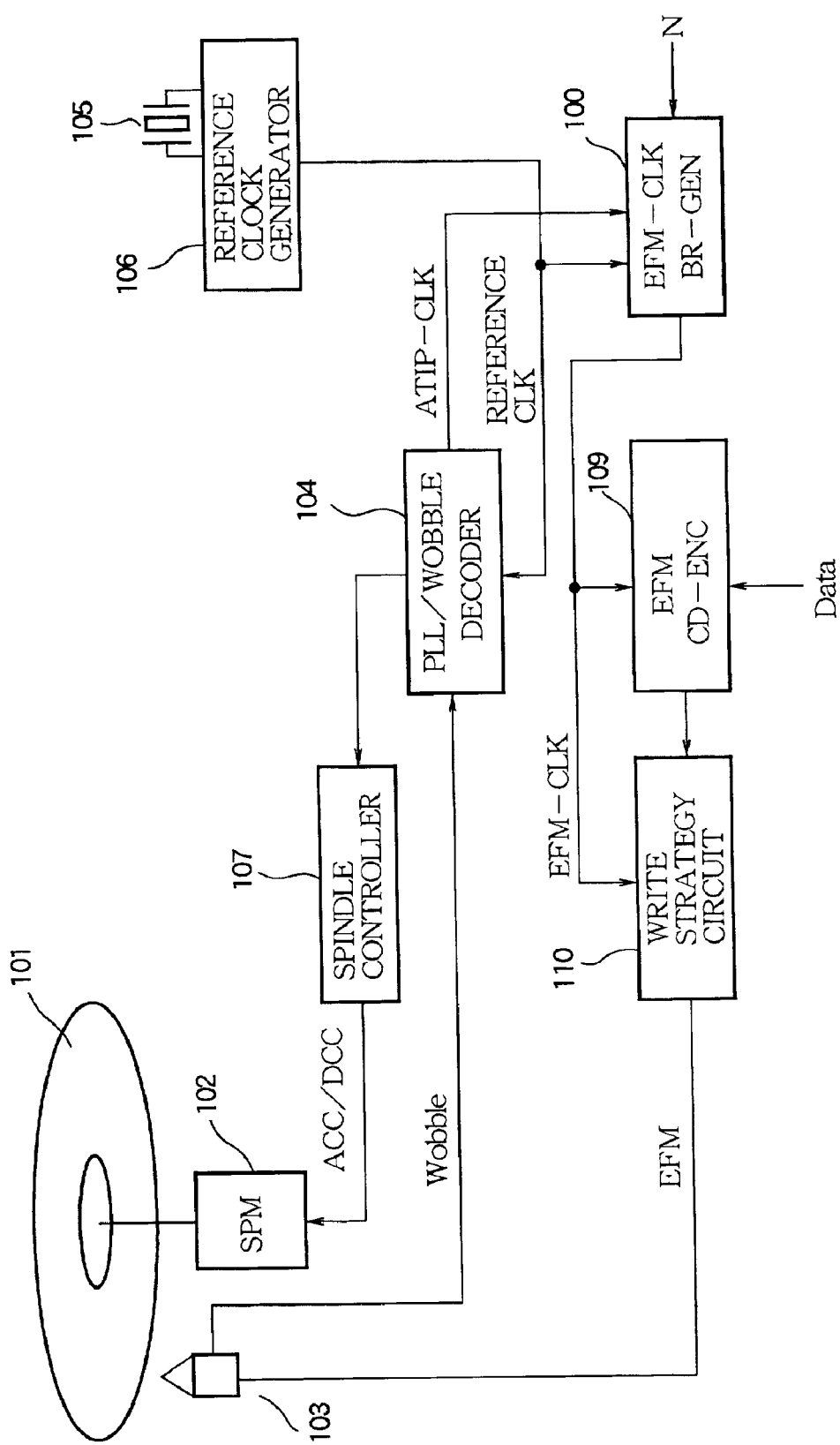
FIG. 3 is a block diagram showing a configuration of an optical disk recording apparatus according to a second embodiment of the present invention.

Second embodiment of the present invention will be described in further detail with reference to the accompanying drawings. FIG. 3 is a block diagram showing a main configuration of an optical disk recording apparatus according to the second embodiment of the present invention.

The optical disk 101 is provided with a continuous spiral track or substantially circular track from the innermost periphery to the outermost periphery in a recording area. A linear density control signal or index signal is overlapped with this track for ensuring the recording linear density of data to a constant value. In this example, the linear density control signal is a wobble including an ATIP (Absolute Time In Pregroove) time code as absolute time information. While the spindle motor (SPM) 102 rotates the optical disk 101, the wobble signal or index signal is read from the optical disk 101 via the pickup 103, and is supplied to the PLL/wobble decoder 104. The reference clock generator 106 generates a constant reference clock signal (reference CLK) based on an oscillation output from the quartz oscillator 105. The PLL/wobble decoder 104 receives this reference clock and controls revolutions of the spindle motor 102 via the spindle controller 107 so that the wobble signal synchronizes with the reference clock. Thus, the optical disk 101 is controlled for rotation at a constant linear velocity. Further, the PLL/wobble decoder 104 extracts an ATIP clock (ATIP-CLK) from the ATIP time code included in the wobble signal.

An EFM (Eight to Fourteen Modulation) clock/bit rate generator (EFM-CLK/BR-GEN) 100 divides or multiplies a constant clock signal given in the form of the reference clock or the ATIP clock with a given ratio N, and generates an EFM clock (EFM-CLK) having a given bit rate. The EFM/CD encoder 109 encodes data to be recorded into a specified recording format according to the EFM clock. The write strategy circuit 110 generates record data from the encoded data according to the EFM clock. This record data is written into the optical disk 101 with the linear density based on the EFM clock or writing clock by means of laser irradiation from the pickup 103.

Figure 4:
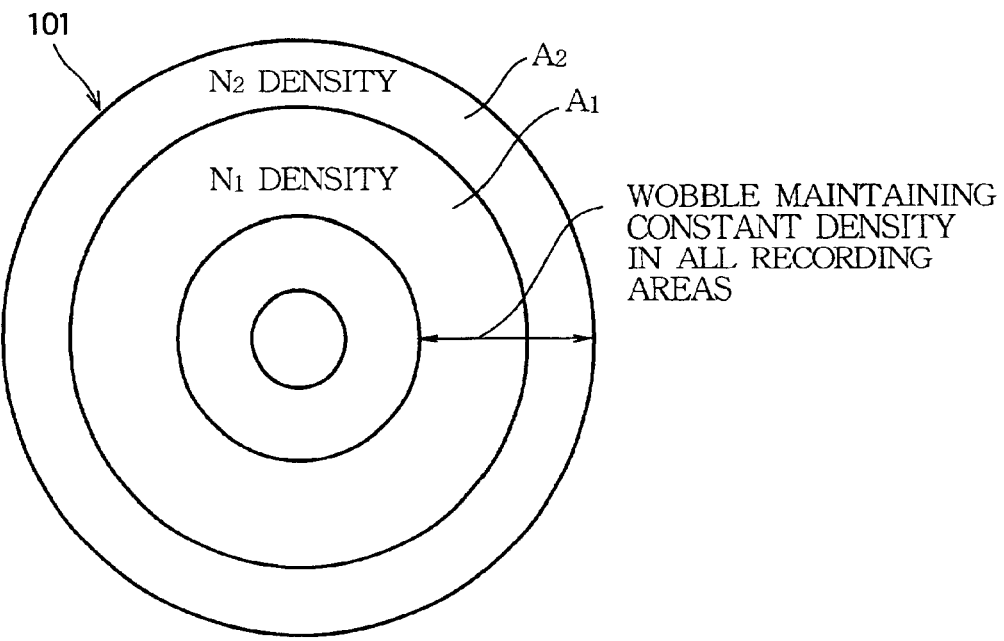
FIG. 4 is a plan view showing recording zones and recording linear densities on an optical disk treated by the aforementioned apparatus.

FIG. 4 shows the optical disk 101 recorded with data by the optical disk recording apparatus. Through the entire recording area on the optical disk, the wobble is written at a constant linear density. In this example, the first recording operation is performed in a first recording zone A1 along an inner periphery by changing ratio N set in the clock/bit rate generator 100 to ratio N1. The second recording operation is performed in a second recording zone A2 along an outer periphery by changing ratio N set in the clock/bit rate generator 100 to ratio N2. Accordingly, data is recorded in the recording zone A1 with the linear density multiplied by N1, and recorded in the recording area A2 with the linear density multiplied by N2. Assuming that N1 is a multiple of 1 and N2 is a multiple of M, data is recorded in the recording zone A1 along the inner periphery with the linear density based on the general CD standards. Data is recorded in the recording zone A2 along the outer periphery with the high linear density M times higher than the normal value N. As a result, data is recorded with a high recording density while maintaining the compatibility to some extent. The recording linear density information about data in the recording zones A1 and A2 is recorded in the TOC (Table of Contents) on the optical disk 101 together with the start position information for each of the zones A1 and A2.

A user may set ratio N when recording data. Alternatively, it may be preferable to divide an area of the optical disk 101 into a plurality of annular zones, to detect a recording point in the radial direction on the optical disk 101, and to automatically select recording linear densities for data corresponding to the respective recording point.

Figure 5:
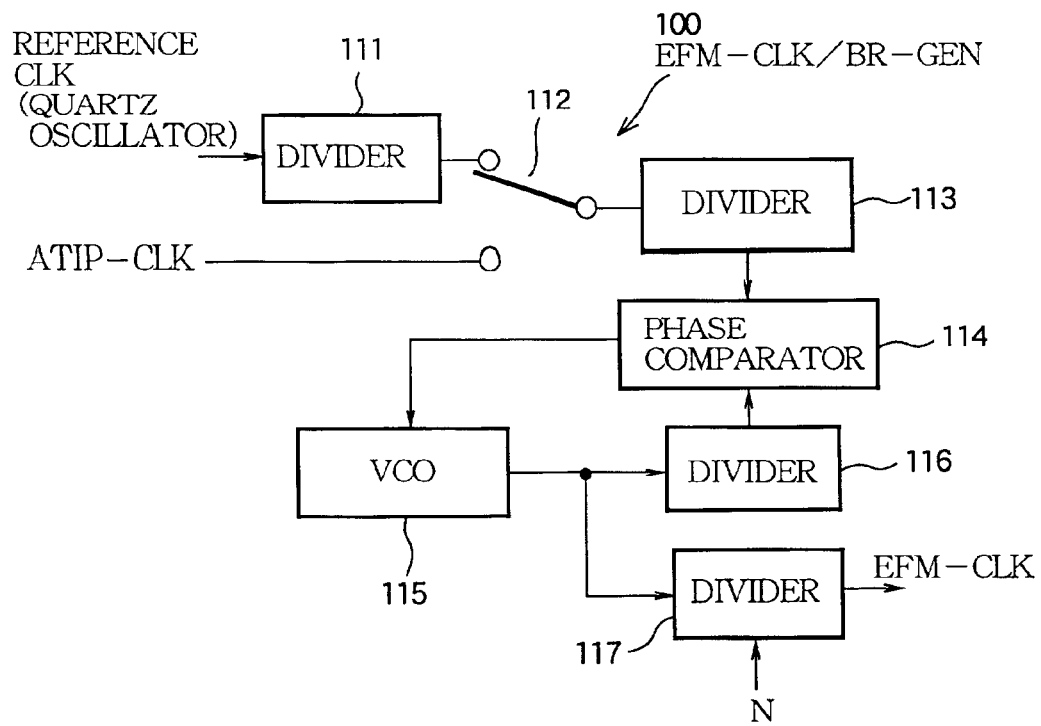
FIG. 5 is a block diagram showing a configuration of an EFM clock/bit rate generator in the aforementioned apparatus.

FIG. 5 is a block diagram exemplifying a detailed configuration of the EFM clock/bit rate generator 100. A divider 111 divides the reference clock generated in the quartz oscillator 105. A selector 112 switches between the divided clock and the ATIP clock. When the ATIP clock is selected and is used as a reference, the EFM clock can follow a track even on an eccentric disk. When an output from the quartz oscillator 105 is selected and is used as the reference, it is possible to easily stabilize the recording apparatus system. During run-up before recording, for example, an output from the quartz oscillator 105 is selected and then the ATIP clock is selected. The clock selected in the selector 112 is frequency-divided in a divider 113, and then is input to one input terminal of a phase comparator 114. An error output from the phase comparator 114 is supplied as a control voltage for a VCO (voltage controlled oscillator) 115. An output from the VCO 115 is divided in a divider 116 and is fed back to another input terminal of the phase comparator 114. An output from the VCO 115 is divided in a divider 117 based on a desired ratio N. An output from the divider 117 is generated as an EFM clock or writing clock.

Given that the reference clock is 33.8688 MHz and the optical disk 101 is rotated at an eight-fold speed, the ATIP clock becomes 3.15 KHz×8=25.2 KHz. When the divider 111 is set to 1344 divisions, the reference clock at the output side of the divider 111 also becomes 25.2 KHz. Given that the divider 113 is set to one division, the VCO 115 is oscillated at 276.5952 MHz, and the divider 116 is set to 10976 divisions, an output from the divider 116 becomes 276.5952 MHz/10976=25.2 KHz. The VCO 115 is controlled under the 25.2 KHz phase comparison. When ratio N is eight divisions and four divisions in the divider 117, the EFM clock is supplied with the following bit rates.

(1) Eight Divisions 276.5952 MHz/8=4.3218 MHz×8: Single density (as per specification)

(2) Four Divisions 276.5952 MHz/4=4.3218 MHz×16: Double density

The VCO 115 is oscillated at 259.308 MHz and the divider 116 is set to 10,290 divisions to generate 259.308 MHz/10290=25.2 KHz. An output from the VCO 115 is set to five divisions (N=5) in the divider 117, thereby providing an EFM clock capable of the following data recording on the eight-fold speed optical disk 101.

259.308 MHz/5=4.3218 MHz×12: 1.5 times density

Figure 6:
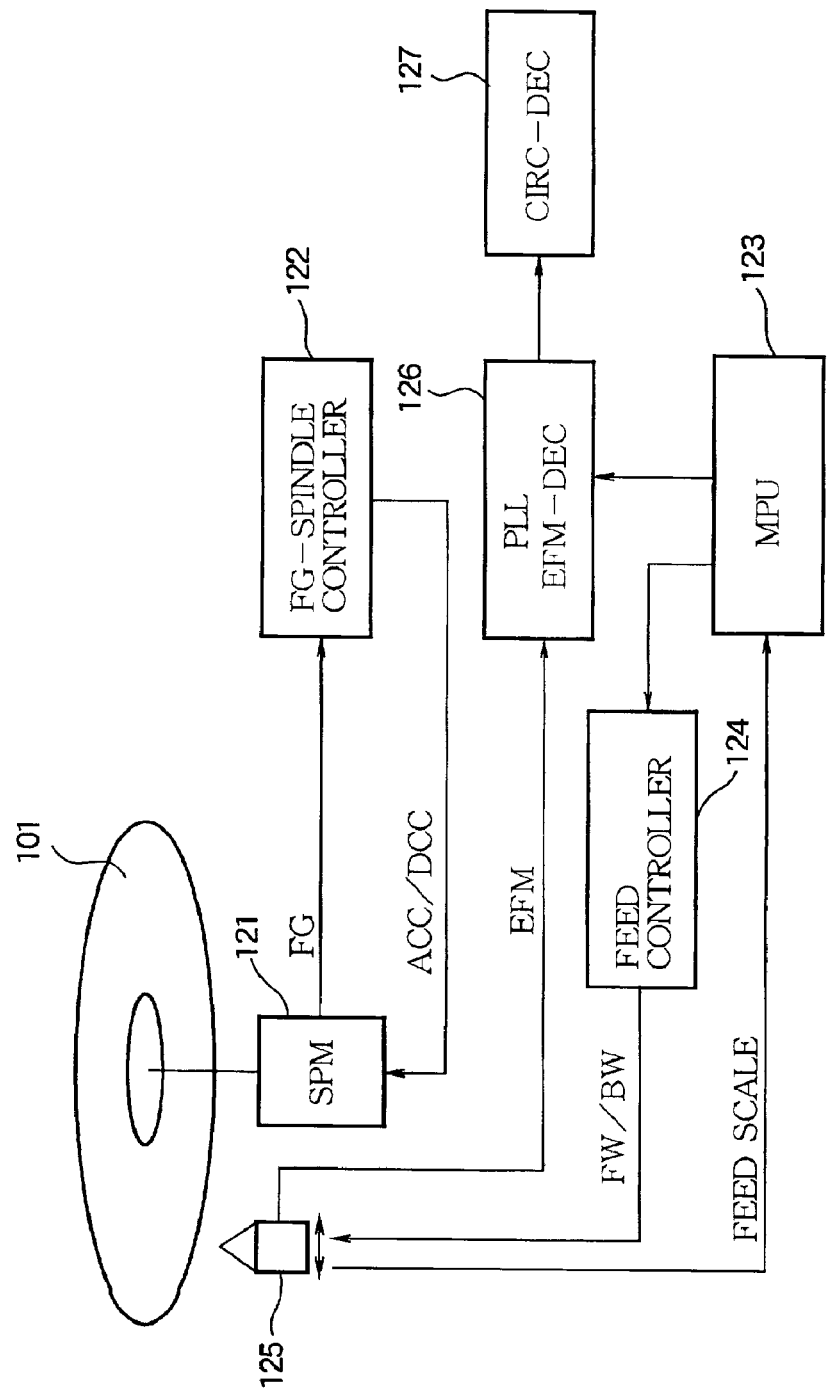
FIG. 6 is a block diagram of an optical disk reproduction apparatus for reproducing data from an optical disk recorded with data by the aforementioned apparatus.
Figure 7:
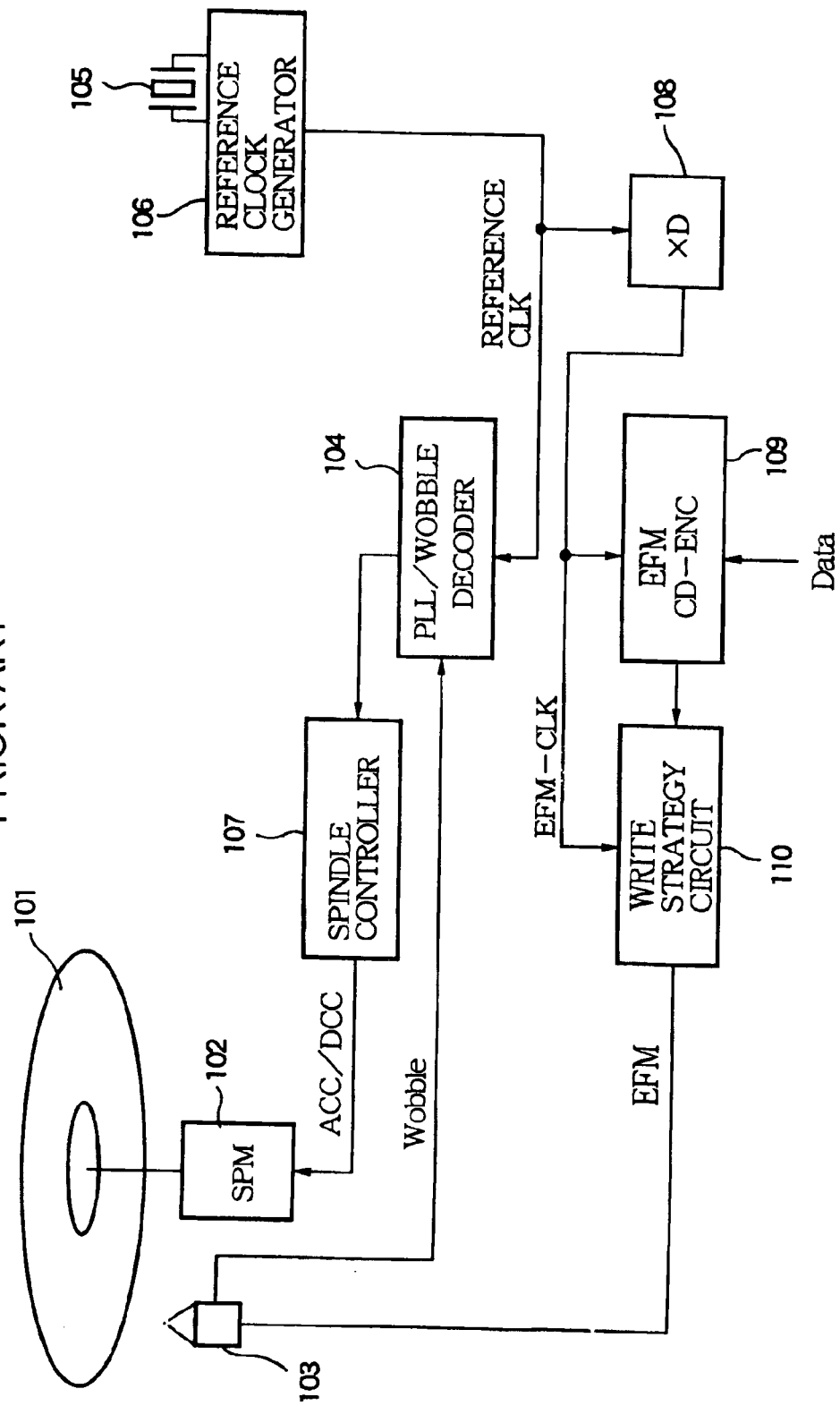
FIG. 7 is a block diagram showing a configuration of a conventional optical disk recording apparatus.

FIG. 6 is a block diagram showing a configuration of an optical disk reproduction apparatus for reproducing data from the optical disk 101 which records data with different linear densities for respective recording zones.

A Hall signal (FG) from a Hall device is generated in response to revolution of a spindle motor (SPM) 121 which rotatively drives the optical disk 101. An FG-spindle controller 122 controls (accelerates or decelerates) the spindle motor 121 and CAV-controls the optical disk 101 at a constant rotational speed such that the Hall signal (FG) maintains a predetermined frequency. According to information written to the TOC of the optical disk 101 for example, an MPU 123 acquires an address for a data block to be reproduced and recording linear density information about the data block. A feed controller 124 moves a pickup 125 to an address of the data block to be reproduced. The radial position information (FEEDSCALE) indicates a location of the pick up 125 on the radius of the optical disk 101. Receiving this information, the MPU 123 computes the current linear velocity based on the CAV revolution speed and the radial position. According to the linear velocity and the recording linear density, the MPU 123 computes the reproduction clock speed of the recorded EFM data to be detected by the pickup 125. Given that the reproduction clock speed is B in relation to the normal recording linear density A, EFM data recorded with a linear density multiplied by N (N×A) provides a reproduction clock speed of B×N.

The MPU 123 sets the computed reproduction clock speed as the PLL's center frequency (lock range) for a PLL/EFM decoder 126. The PLL/EFM decoder 126 receives the reproduced EFM signal and applies a PLL feedback to the received EFM signal for extracting the reproduction clock. The PLL/EFM decoder 126 uses this extracted reproduction clock for decoding the received EFM signal. Data decoded in the PLL/EFM decoder 126 is further decoded in a CIRC (Cross Interleaved Reed-Solomon Code) decoder 127. At a given time interval, the apparatus repeatedly detects a radial position of the pickup 125 on the disk, computes the linear velocity of the disk, and sets the center frequency.

New additions to this reproduction apparatus are a reproduction speed computation routine based on the recording linear density information in the MPU 123 and computation of an EFM data reproduction clock speed. For the remaining parts, the system utilizes almost the same conventional optical disk reproduction apparatus, and enables reproduction of data from an optical disk having a plurality of recording zones with different linear densities.

As mentioned above, according to the second aspect of the present invention, the inventive apparatus changes the ratio of division/multiplication for the reference clock, depending on each recording zone while controlling the optical disk with the constant linear velocity based on a linear density control signal. There is provided an advantageous effect of a plurality of independent recording operations with different data recording linear densities on an optical disk.

Next, the description is given for the third aspect of the invention. In recent years, recording media such as CD-R, CD-RW, etc. are available at low prices and are becoming the mainstream of recording media along with the widespread use and the improved manufacturing technology of these media. As exemplified by DVD, there is remarkable advancement in developing a laser used for the pickup and other fundamental technologies for data recording and reproduction. If the optical disk linear density is increased equally or a track pitch is narrowed partially or entirely, there arises a problem that the optical disk cannot be recognized by a conventional reproduction apparatus which supports only the standard or default density for reproduction. By applying an improved fundamental recording technology to inexpensively available media, it is possible to provide a higher recording density by maintaining the compatibility with the existing standards.

Figure 14:
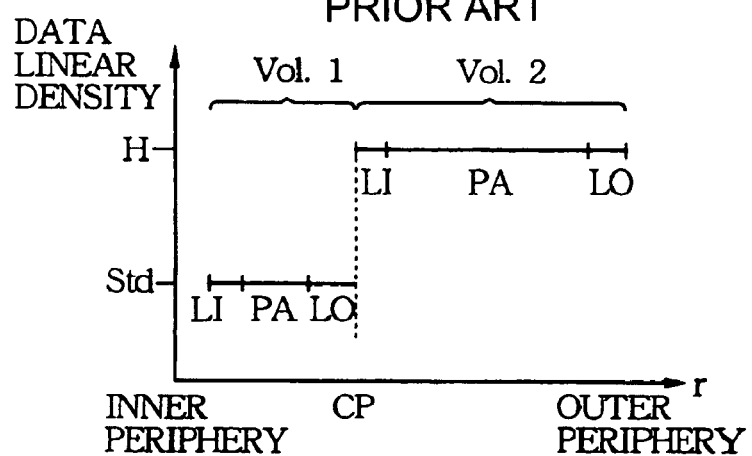
FIG. 14 shows the relationship between a radial position and a data linear density on a conventional optical disk.

For example, on a 2-session-at-once optical disk shown in FIG. 14, a first session Vol. 1 to the inner periphery zone is recorded with the standard or default density. A second session Vol. 2 to the outer periphery zone is recorded with the 1.5-density. This enables reproduction of the first session even on a reproduction apparatus which is only capable of data reproduction with the standard density. A reproduction apparatus capable of treating high-density recording disks can reproduce data from all zones including the second session to the outer zone, thereby increasing the recording capacity.

If data is recorded on a single optical disk with different linear densities, however, additional operations are needed. Namely, a recording operation is temporarily stopped on a boundary (CP: Critical Point) between two zones. The apparatus is configured to switch between PLL for the standard linear density and PLL for the high density. A seek operation is performed to detect the CP and restart recording. Accordingly, extra time and operations are needed such as turning off an LD, configuring the settings, turning on the LD again, performing a seek operation, etc.

The third aspect of the invention has been made in consideration of the foregoing. It is therefore an object of the third aspect of the invention to provide an optical disk recording method, an optical disk recording apparatus, and an optical disk recorded with data by that recording method capable of successively performing a plurality of independent recording operations with different linear densities on an optical disk which is even designed for recording data with a constant linear density.

Figure 8:
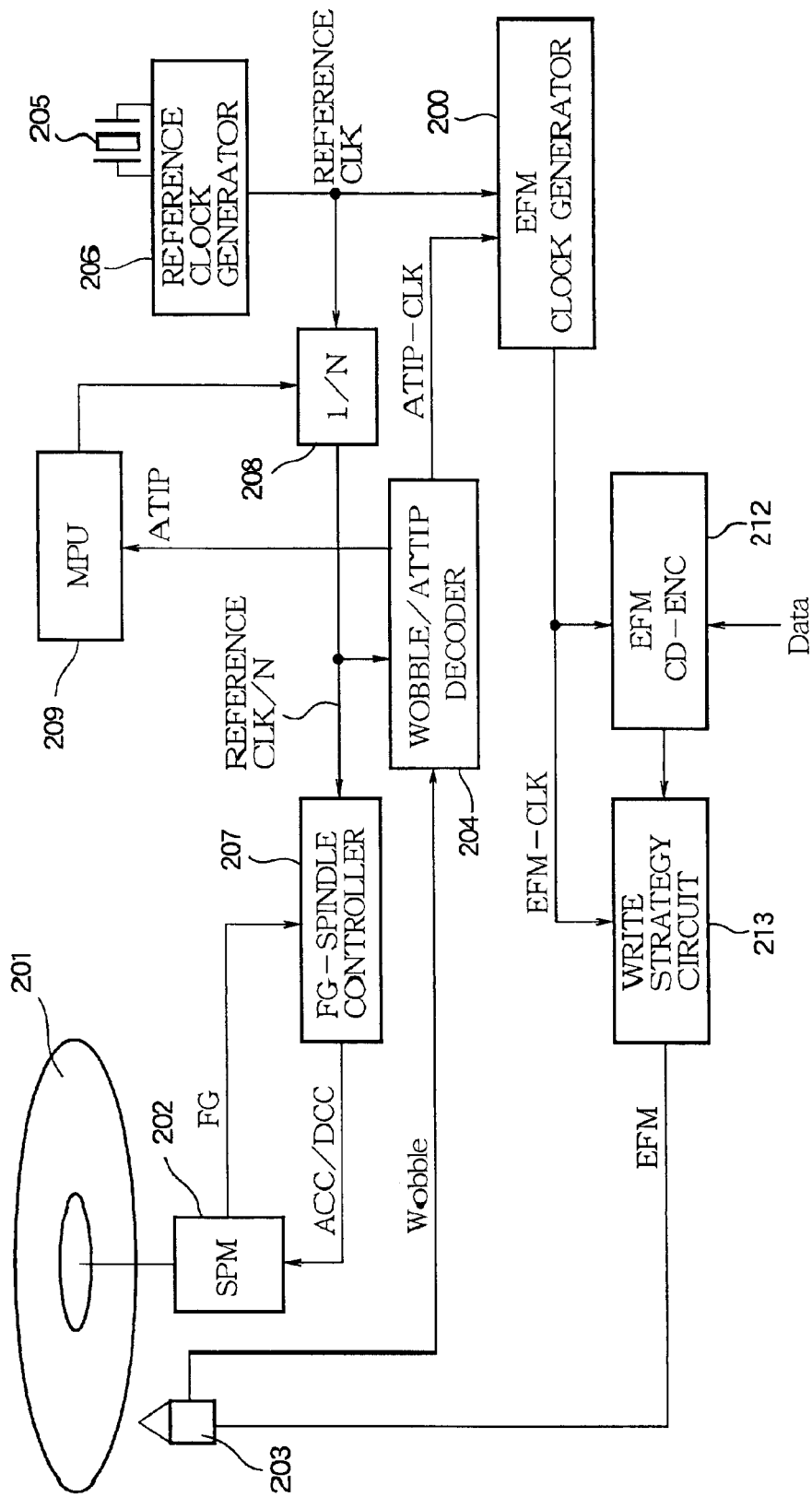
FIG. 8 is a block diagram showing a configuration of an optical disk recording apparatus according to a third embodiment of the present invention.

Third embodiments of the present invention will be described in further detail with reference to the accompanying drawings. FIG. 8 is a block diagram showing a main configuration of an optical disk recording apparatus according to the third embodiment of the present invention.

The optical disk 201 is provided with a continuous spiral or circular track from the innermost periphery to the outermost periphery in a recording area. A linear density control signal is written in overlapped form with this track by a constant linear density for specifying the recording linear density of data. In this example, the recording linear density control signal is a wobble signal or index signal including an ATIP (Absolute Time In Pregroove) time code as absolute time information. A spindle motor (SPM) 202 rotatively drives the optical disk 201.

When the optical disk 201 is CAV-controlled, an FG-spindle controller 207 controls revolution of the spindle motor 202 so that an FG pulse output from a Hall element of the spindle motor 202 synchronizes with an N-division reference clock. Consequently, the optical disk 201 is controlled for revolution with a constant revolution speed.

A wobble signal or index signal is read from the optical disk 201 via a pickup 203. When the optical disk 201 is CLV-controlled, the spindle motor 202 is controlled for revolution via the FG-spindle controller 207 such that the wobble signal synchronizes with the N-division reference clock. Consequently, the optical disk 201 is controlled for revolution with a constant linear velocity.

A wobble/ATIP decoder 204 extracts an ATIP time code and an ATIP clock from the wobble signal. The extracted ATIP time code is supplied to an MPU 209. The extracted ATIP clock is supplied to an EFM clock generator 200. The MPU 209 identifies a recording position or point along a radial direction on the optical disk 201, and varies a division ratio of a variable divider 208 based on the recording position.

When the optical disk 201 is CAV-controlled, the EFM (Eight to Fourteen Modulation) clock generator 200 generates an EFM clock signal or writing clock signal by dividing or multiplying the ATIP clock. When the optical disk 201 is CLV-controlled, the EFM clock generator 200 generates an EFM clock signal (EFM-CLK) by dividing or multiplying the reference clock. According to the EFM clock signal, an EFM/CD encoder 212 encodes data to be recorded into a specified recording format. A write strategy circuit 213 generates record data from the encoded data according to the EFM clock. This record data is written into the optical disk 201 with the linear density based on the EFM clock by means of laser irradiation from the pickup 203.

Figure 9:
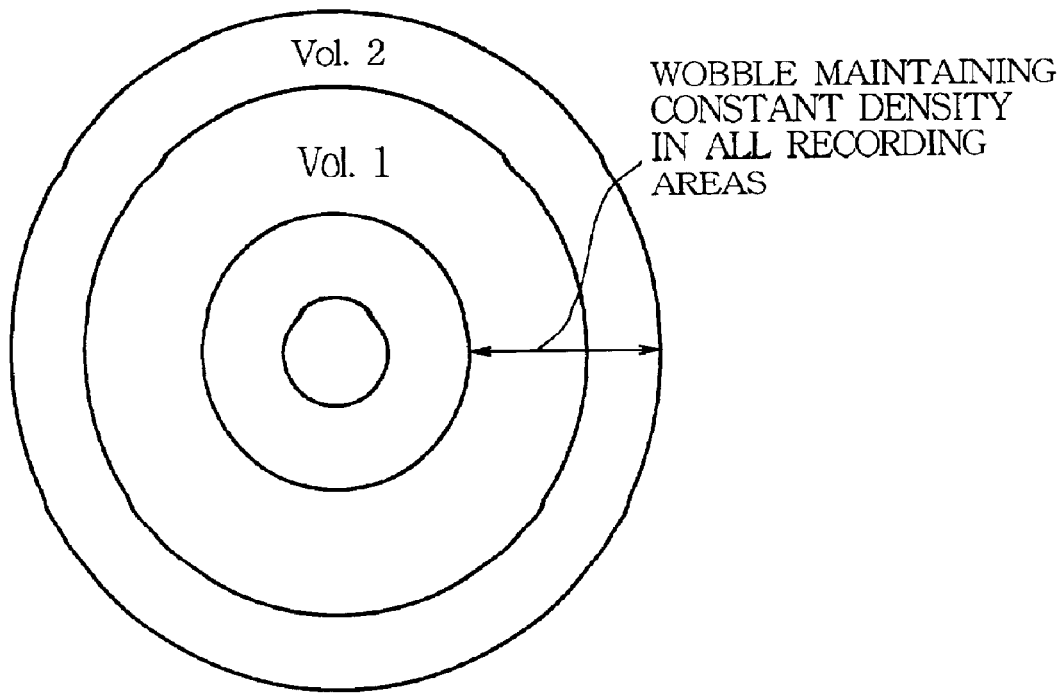
FIG. 9 is a plan view showing recording zones and recording linear densities on an optical disk recorded with data by the aforementioned apparatus.
Figure 10:
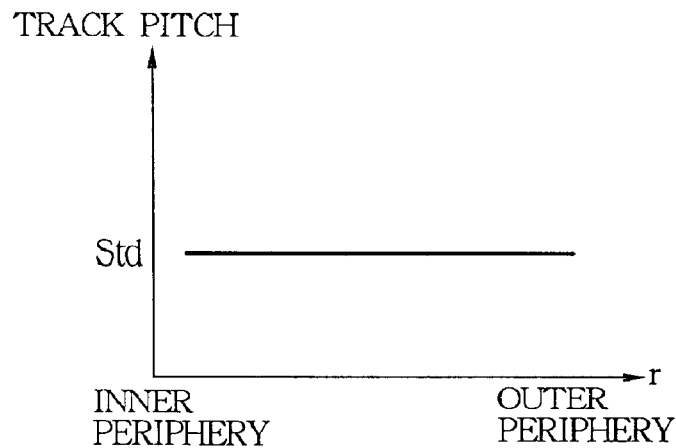
FIGS. 10(a)–10(c) show the relationship among a radial position, a track pitch, a wobble linear density, and a data linear density on the aforementioned optical disk.
Figure 10:
Figure 10:
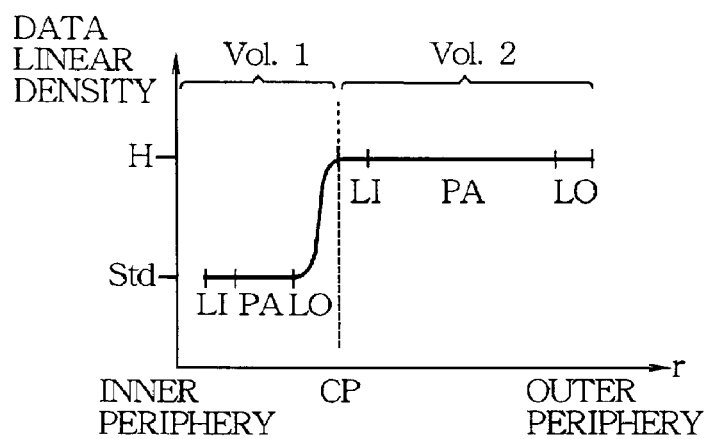

FIG. 9 shows the optical disk 201 recorded with data by the optical disk recording apparatus. FIG. 10 shows the relationship among a radial position, a track pitch, a wobble linear density, and a data linear density on the optical disk 201.

Throughout the recording areas on the optical disk, linear density of the wobble and the track pitch are ensured constant. By contrast, the recording of data uses different linear densities on the inner and outer peripheries. The optical disk 201 shown exemplifies a 2-session-at-once disk. A first session Vol. 1 to the inner periphery zone performs recording of date with the CD-standard compliant default density (N=1), namely the first recording linear density. A second session Vol. 2 to the outer periphery zone performs recording of data with the second recording linear density higher than that for the first session Vol. 1. Each zone comprises a lead-in area LI, a program area PA, and a lead-out area LO in the order from the top to end. When data is contained between the top of the lead-out area LO of the first session Vol. 1 and the end of the lead-in area LI of the second session Vol. 2, the recording linear density of the data gradually changes from the first recording linear density to the second recording linear density through an intermediate of the CP.

The optical disk 201 is created according to the following recording operations. First, the variable divider 208 is set to N=1 for starting data recording from the innermost periphery to the first session Vol. 1 with the default density. Data is recorded on the lead-in area LI and the program area PA in the first session Vol. 1, and successively on the lead-out area LO in the first session Vol. 1. When the position of the pickup 203 above the optical disk 201 shifts from the top of the lead-out area LO in the first session Vol. 1 at a specified time interval, the MPU 209 gradually increases the value of division ratio N for the variable divider 208. This decreases the revolution speed of the optical disk 201 and accordingly increases the recording linear density. The MPU 209 selects a proper N value and a proper time constant for the variable divider 208 so that the second session Vol. 2 reaches a target recording density before the end of the first session Vol. 1 with a specified time allowance. The next target linear density is now enabled before the end of the lead-out area LO in the first session Vol. 1 with the specified time allowance. All data is then successively recorded on the remainder of the lead-out area LO in the first session Vol. 1 and the next second session Vol. 2.

According to this embodiment, the MPU 209 decreases the revolution speed of the optical disk 201 based on the recording position on the optical disk 201 by using recording linear densities through a transition area between the first and second sessions. By doing so, the recording linear density changes gradually, making it possible to continuously perform the first and second sessions.

Figure 11:
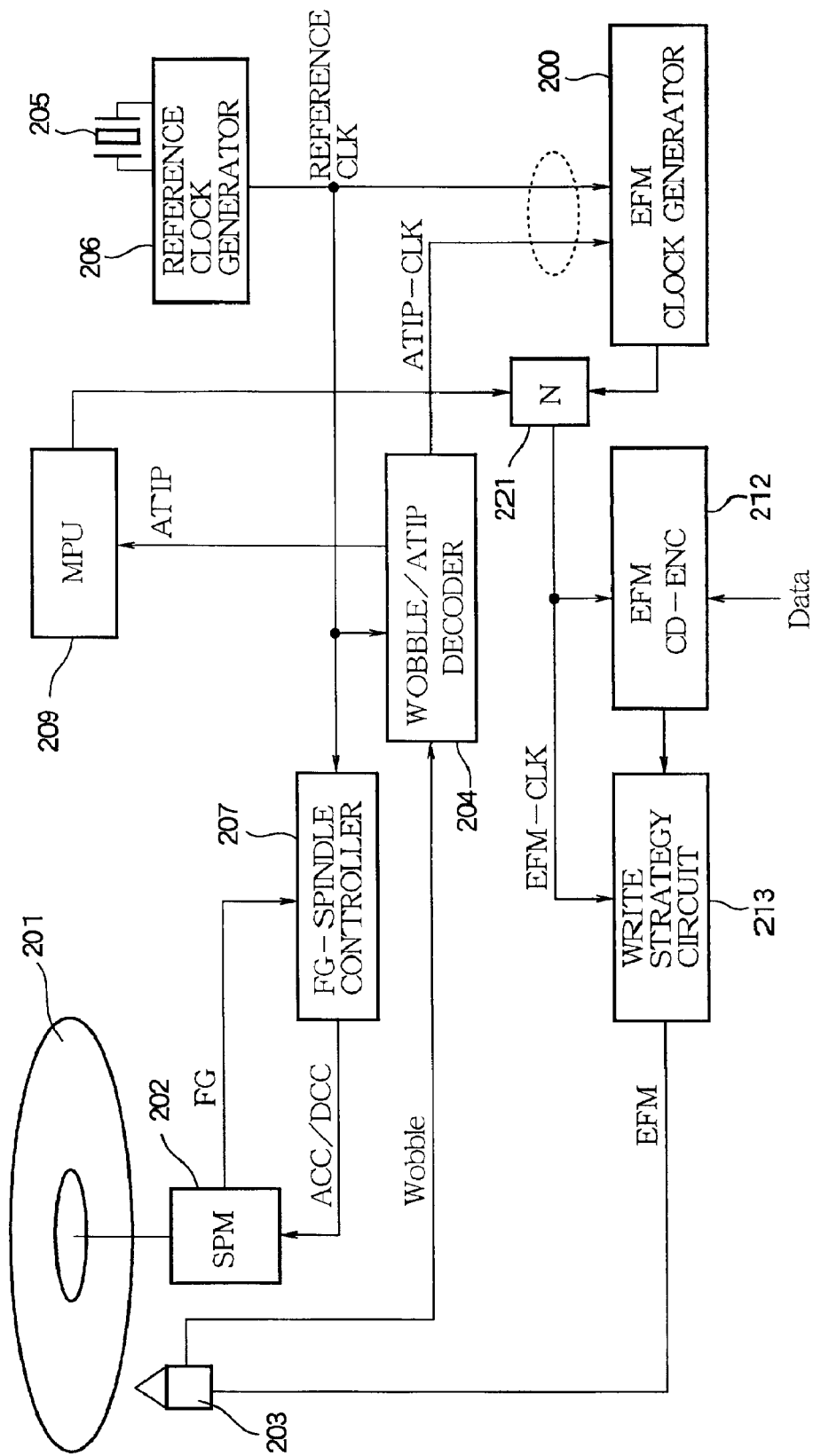
FIG. 11 is a block diagram showing a configuration of an optical disk recording apparatus according to a variational embodiment of the present invention.

FIG. 11 is a block diagram showing a configuration of an optical disk recording apparatus according to a variational embodiment of the present invention. While the aforementioned embodiment increases the recording linear density by decreasing the revolution speed of the optical disk 201, this embodiment increases the recording linear density by increasing a bit rate of the EFM clock.

In this embodiment, a variable multiplier 221 multiplies the EFM clock generated in the EFM clock generator 200 by N, and supplies the EFM clock to the EFM/CD encoder 212 and the write strategy circuit 213. The wobble/ATIP decoder 204 and the FG-spindle controller 207 are supplied with the reference clock from the reference clock generator 206.

In this apparatus, the MPU 209 gradually increases the N value for the variable multiplier 221 from 1 at a boundary between adjacent recording zones, thus gradually increasing the bit rate of the EFM clock and the recording linear density. The aforementioned variable multiplier 221 may be installed at a location indicated by a broken line in FIG. 11. Namely, it is likewise possible to increase the EFM clock bit rate when the variable multiplier 221 multiplies by N the ATIP clock supplied from the wobble/ATIP decoder 204 to the EFM clock generator 200 or the reference clock supplied from the reference clock generator 206 to the EFM clock generator 200.

Figure 12:
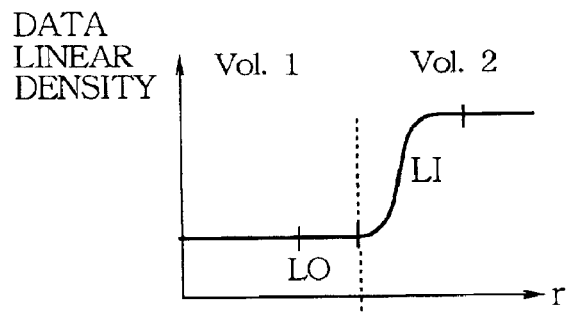
FIGS. 12(a)–12(d) exemplify patterns in a transition area of the recording linear density on the aforementioned optical disk.
Figure 12:
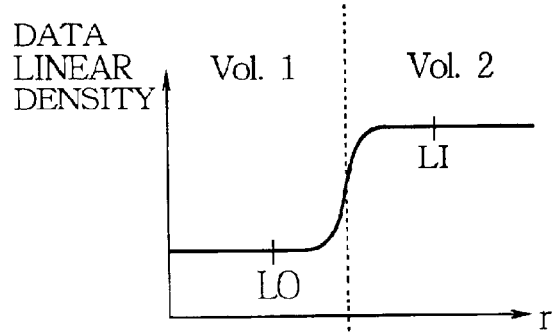
Figure 12:
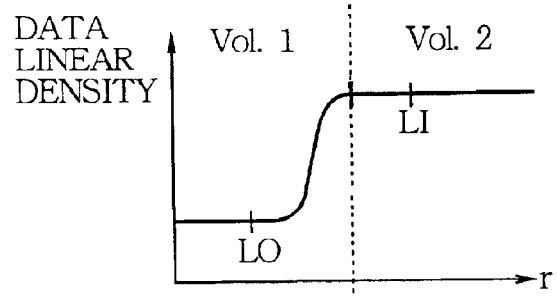
Figure 12:
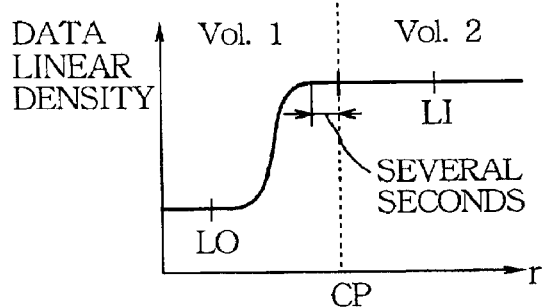

FIG. 12 exemplifies transition patterns in a transition area of the recording linear density.

FIG. 12(*a*) exemplifies a transition area included in the lead-in area LI of the second session Vol. 2. FIG. 12(*b*)

exemplifies a transition area extending over the first and second sessions Vols. 1 and 2. FIG. 12(c) exemplifies a transition area included in the lead-out area LO of the first session Vol. 1. FIG. 12(d) shows an example of attaching a high recording linear density period for several seconds to the end of the lead-out area LO in the transited first session for continuation to the lead-in area LI in the second session Vol. 2.

During reproduction of the second session Vol. 2, a reverse seek may allow the pickup to enter the lead-out area LO of the first session across the lead-in area LI of the second session. In such a case, the example in FIG. 12(d) ensures the same recording linear density as for the second session, thereby enabling a signal to be reproduced at a reached access point. There is provided an advantage of determining the position and immediately returning to the second session by means of a forward seek.

Figure 13:
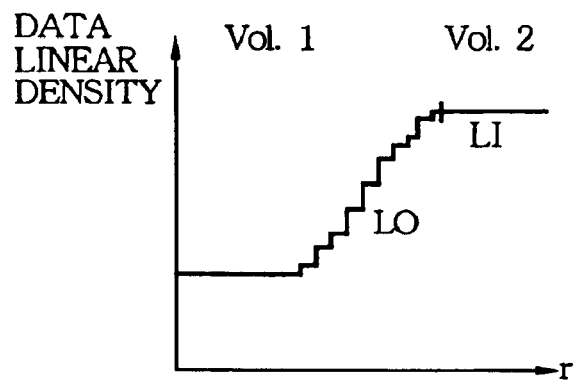
FIGS. 13(a) and 13(B) are a diagram explaining an example of the aforementioned transition area.
Figure 13:
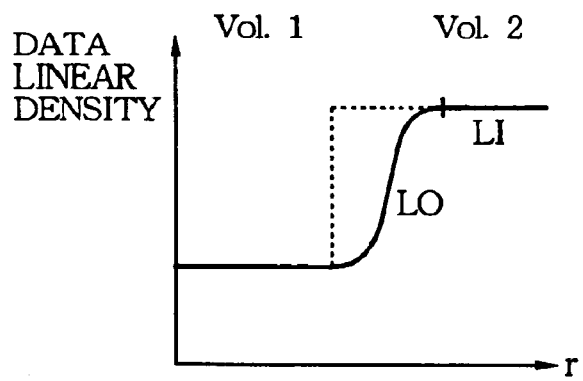

As a specific transition method, there may be a fast or slow response to a linear density change with respect to control of the MPU 209. This response is hereafter referred to as a PLL constant. When the PLL constant is fast, as shown in FIG. 13(a), smooth transition is achieved by gradually changing the (N-division) reference clock or the EFM clock. When the PLL constant is slow, as shown in FIG. 13(b), smooth transition is also achieved by changing the N value to a target value at once. Further, it may be preferable to change the division/multiplication setting and the PLL constant at a time.

By the way, the following information may be recorded in the TOC (Table of Contents) and the first session program area. on the optical disk recorded with data by the aforementioned recording method.

(1) Density increasing start address=First session LO start address+5 seconds (2) Density increasing end address=First session LO end address−5 seconds (3) Second session density=1.5

Depending on cases, only the information (3) is sufficient.

Based on these pieces of information, the MPU 209 locates a transition area for the recording linear density and, if traceable, keeps track of that location. When the optical disk 201 is CAV-controlled, the MPU 209 acquires the recording linear density information as well as an address of the data block to be reproduced according to the information written to the TOC of the optical disk 201, for example. The MPU 209 receives the radial position information (FEEDSCALE) indicating the position of the pickup 203 on the radius of the optical disk 201. Then, the MPU 209 computes the current linear velocity based on the CAV revolution speed and the radial position. According to the linear velocity and the recording linear density, the MPU 209 computes a reproduction clock speed for the recorded EFM data to be detected by the pickup 203. The MPU 209 then sets the computed reproduction clock speed as the PLL's center frequency (lock range) for an EFM decoder (not shown). The EFM decoder receives the reproduced EFM signal and applies a PLL feedback to the received EFM signal for extracting the reproduction clock. The EFM decoder uses this extracted reproduction clock for decoding the received EFM signal. At a given time interval, the MPU 209 repeatedly detects a radial position of the pickup 203 on the disk, computes the linear velocity, and sets the center frequency.

As mentioned above, according to the third aspect of the invention, the optical recording apparatus records data while gradually changing the recording linear density between adjacent recording zones on the optical disk. Accordingly, it is possible to successively record data on a plurality of recording zones with different recording linear densities without temporarily stopping the operation. This provides effects of eliminating a seek operation or a setting operation, shortening the recording time, and decreasing the number of recording steps.

What is claimed is:

1. A method of recording contents information in a track of an optical disk having first index information recorded along the track, the first index information indicating absolute position or time at a first progression rate along the track, comprising:

generating second index information when a second progression rate along the track is different from the first progression rate determined by the first index information; and adding the second index information into the contents information; and recording the second index information toaether with the contents information progressively on the track at the second progression rate.

2. The method according to claim 1, wherein the step of generating generates the second index information having the second progression rate along the track, which is set greater than the first progression rate determined by the first index information.

3. The method according to claim 1, wherein the step of generating generates the second index information having the second progression rate along the track, which is set smaller than the first progression rate determined by the first index information.

4. An optical disk recording apparatus for recording contents information on a track of an optical disk having first index information recorded along the track, the first index information indicating absolute position or time along the track at a first progression rate, the apparatus comprising:

a recording section that successively modulates a laser beam by the contents information and irradiates the modulated laser beam onto the optical disk to thereby record the contents information on the track at a second progression rate;

a generating section that generates second index information when the second progression rate along the track is different from the first progression rate determined by the first index information; and a feeding section that feeds the generated second index information and the contents information to the recording section at a clock rate corresponding to the second progression rate along the track, thereby enabling the recording section to write the second index information on the track together with the contents information at the second progression rate.

5. An optical disk recording apparatus for recording contents information on a track of an optical disk having first index information recorded along the track, the first index information indicating absolute position or time along the track at a first progression rate, the apparatus comprising:

a recording section that successively modulates a laser beam by the contents information and irradiates the modulated laser beam onto the optical disk to thereby record the contents information on the track at a second progression rate;

a reproducing section that reproduces the first index information recorded along the track based on the laser beam reflected from the optical disk;

a generating section that generates second index information when the second progression rate along the track is a multiple of the first progression rate determined by the reproduced first index information; and a feeding section that feeds the generated second index information and the contents information to the recording section at a clock rate corresponding to the multiple of the first progression rate, thereby enabling the recording section to write the second index information on the track together with the contents information at the multiple of the first progression rate.

6. An optical disk recording apparatus for recording contents information on a track of an optical disk having first index information recorded along the track, the first index information indicating absolute position or time along the track at a first progression rate, the track being wobbled in a predetermined format, the apparatus comprising:

a recording section that successively modulates a laser beam by the contents information and irradiates the modulated laser beam onto the track while the optical disk is rotated, to thereby record the contents information on the track at a second progression rate;

a detecting section that detects a signal representing the wobble and having a frequency from the laser beam reflected by the optical disk;

a driving section that rotates the optical disk for maintaining the frequency of the detected signal to a fixed value;

a reproducing section that reproduces the first index information recorded along the track based on the laser beam reflected from the optical disk;

a generating section that generates second index information when the second progression rate is a multiple of the first progression rate determined by the reproduced first index information; and a feeding section that feeds the generated second index information and the contents information to the recording section at a clock rate corresponding to the multiple of the first progression rate, thereby enabling the recording section to write the second index information on the track together with the contents information at the multiple of the first progression rate.

7. An optical disk recording apparatus for recording contents information on a track of an optical disk having first index information recorded along the track, the first index information indicating absolute position or time along the track at a first progression rate, the track being wobbled according to the first index information, the apparatus comprising:

a recording section that successively modulates a laser beam by the contents information and irradiates the modulated laser beam onto the track while the optical disk is rotated, to thereby record the contents information on the track at a second progression rate;

a reproducing section that reproduces the first index information recorded along the track based on the laser beam reflected from the optical disk;

a generating section that generates second index information when the second progression rate along the track is a multiple of the first progression rate determined by the reproduced first index information; and a feeding section that feeds the generated second index information and the contents information to the recording section at a clock rate corresponding to the multiple of the first progression rate determined by the reproduced first index information, thereby enabling the recording section to write the second index information on the track together with the contents information at the multiple of the first progression rate along the track.

* * * * *